United States Patent
Su et al.

(10) Patent No.: US 10,812,129 B2
(45) Date of Patent: Oct. 20, 2020

(54) METHOD AND ENTITY IN TDD RADIO COMMUNICATIONS

(71) Applicant: Telefonaktiebolaget LM Ericsson (publ), Stockholm (SE)

(72) Inventors: Youping Su, Solna (SE); Ming Li, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/317,520

(22) PCT Filed: Jun. 16, 2014

(86) PCT No.: PCT/CN2014/079959
§ 371 (c)(1),
(2) Date: Dec. 9, 2016

(87) PCT Pub. No.: WO2015/192297
PCT Pub. Date: Dec. 23, 2015

(65) Prior Publication Data
US 2017/0126270 A1    May 4, 2017

(51) Int. Cl.
*H04B 1/56*    (2006.01)
*H04B 1/54*    (2006.01)
*H04L 5/14*    (2006.01)

(52) U.S. Cl.
CPC ............... *H04B 1/56* (2013.01); *H04B 1/54* (2013.01); *H04L 5/14* (2013.01)

(58) Field of Classification Search
CPC ............ H04B 1/56; H04L 5/14; H04W 88/06; H04W 88/08
See application file for complete search history.

(56) References Cited

U.S. PATENT DOCUMENTS 5,903,820 A * 5/1999 Hagstrom ............... H04B 1/40
                                                      333/124
7,512,392 B2 * 3/2009 Millard ................. H04B 1/1036
                                                      455/266
(Continued)

FOREIGN PATENT DOCUMENTS

CN      1141517 A    1/1997
CN      1472978 A    2/2004
(Continued)

OTHER PUBLICATIONS

Kickman, Analog Electronics, 2nd edition, 1999, publisher Newnes, p. 48 (Year: 1999).*
(Continued)

*Primary Examiner* — Un C Cho
*Assistant Examiner* — Yu-Wen Chang
(74) *Attorney, Agent, or Firm* — Baker Botts, LLP

(57) ABSTRACT

Embodiments provides a radio network entity and the method thereof for improving filtering performance in a time division duplexing radio communication system, the radio network entity comprises: a first filter, which is configured to perform a first type of filtering for a signal to be transmitted to, or received from a device in the radio communication system through a radio interface, with a common filtering requirement for transmitting and receiving fulfilled, a second filter, which is configured to perform a second type of filtering for the signal to be transmitted to the device, with additional filtering requirement for transmitting besides the common filtering requirement fulfilled; and a third filter, which is configured to perform a third type of filtering for the signal received from the device, with additional filtering requirement for receiving besides the common filtering requirement fulfilled.

12 Claims, 9 Drawing Sheets

(56) References Cited

U.S. PATENT DOCUMENTS

| | | | |
|---|---|---|---|
| 8,027,646 B1* | 9/2011 | Rausch | H04B 1/52 455/63.4 |
| 8,204,451 B1* | 6/2012 | Kheirkhahi | H03L 7/099 370/280 |
| 8,989,690 B2* | 3/2015 | Devries | H04B 1/1036 455/226.1 |
| 2002/0085626 A1* | 7/2002 | Starr | H04B 15/02 375/149 |
| 2003/0012260 A1 | 1/2003 | Walley et al. | |
| 2004/0005867 A1 | 1/2004 | Yu | |
| 2006/0035620 A1 | 2/2006 | Millard et al. | |
| 2007/0080843 A1* | 4/2007 | Lee | H03M 3/462 341/155 |
| 2008/0107217 A1* | 5/2008 | Vrcelj | H04B 1/1036 375/350 |
| 2008/0174470 A1 | 7/2008 | Lum et al. | |
| 2010/0048196 A1 | 2/2010 | Georgantas et al. | |
| 2012/0243447 A1 | 9/2012 | Weissman et al. | |
| 2012/0288043 A1* | 11/2012 | Chen | H04B 1/109 375/345 |
| 2013/0028357 A1* | 1/2013 | Haub | H04B 1/1027 375/350 |
| 2013/0165067 A1 | 6/2013 | Devries et al. | |
| 2016/0359506 A1* | 12/2016 | Ellae | H04B 1/0057 |

FOREIGN PATENT DOCUMENTS

| | | |
|---|---|---|
| CN | 102457992 | 5/2012 |
| CN | 102523061 | 6/2012 |
| CN | 102780994 | 11/2012 |
| EP | 0 829 915 A3 | 4/2000 |
| JP | 8-316870 A | 11/1996 |
| JP | 2000 91943 A | 3/2000 |
| JP | 2002-185356 A | 6/2002 |
| JP | 2008 298404 A | 12/2008 |
| JP | 2012-142695 A | 7/2012 |
| KR | 2005 0120715 A | 12/2005 |
| RU | 2 386 211 C2 | 4/2010 |
| WO | 02054693 A1 | 7/2002 |

OTHER PUBLICATIONS

Extended European Search Report for Application No./Patent No. 14895128.8-1874 / 3155868 PCT/CN2014079959—dated Nov. 17, 2017.

Examination Report No. 2 for Your Standard Patent Application issued by the Australian Government, IP Australia for Application No. 2014398168—dated Dec. 4, 2017.

Japanese Office Action Issued for Patent Application No. 2016-567593 (English Summary attached)—dated Jan. 29, 2018.

Russian Office Action With Search Report issued for Application No. 2017101082/08(001729)—dated Jan. 31, 2018.

Examination Report No. 1 for Your Standard Patent Application issued by the Australian Government, IP Australia for Application No. 2014398168—dated Jun. 28, 2017.

First Examination Report issued by the New Zealand Intellectual Property Office for IP No. 726392; Patent: Method and Entity in TDD Radio Communications; Applicant: Telefonaktiebolaget LM Ericsson (publ)—dated Jun. 12, 2017.

Examination Report issued by the Intellectual Property Office of Singapore for Application No. 11201609160Y—dated Sep. 4, 2017.

PCT Notification of Transmittal of the International Search Report and the Written Opinion of the International Searching Authority, or the Declaration for International application No. PCT/CN2014/079959—dated Mar. 16, 2015.

Japanese Notice of Allowance issued for 2016-567593—dated Jun. 22, 2018.

Decision to Grant issued by the Russian Federal Service for Intellectual Property for Application No. 2017101082/08(001729)—dated May 3, 2018.

Office Action issued by Japanese Patent Office for No. 2016-567593 (English summary attached)—dated Apr. 23, 2018.

Examination Report No. 3 for Your Standard Patent Application issued by the Australian Government/IP Australia for Application No. 2014398168—dated Jun. 21, 2018.

Notice of Acceptance for Your Patent Application issued by the Australian Government for Application No. 2014398168—dated Jul. 11, 2018.

Mexican Office Action issued for MX/a/2016/014777—dated Jun. 12, 2018.

Office Action issued by the Israeli Patent Office for patent request No. 248611—dated Aug. 6, 2018.

Notification of Non-Compliance With Substantive Requirements and Invitation to Submit Observations and/or Amended Application for Application No. AP/P/2016/009654—dated Sep. 3, 2018.

EPO Communication Pursuant to Article 94(3) EPC issued by Application No. 14 895 128.8-1220—dated Nov. 2, 2018.

Examination Report issued by the Government of India for Application No. 201617037131—dated Feb. 22, 2019.

Office Action issued by the Canadian Intellectual Property Office for Application No. 2,952,062—dated Jan. 28, 2019.

Chinese Office Action issued for Application No. 201480079970.3—dated Aug. 8, 2019.

Office Action issued by the Japanese Patent Office for Japanese Patent Application No. 2018-137037—dated Sep. 27, 2019.

* cited by examiner

METHOD AND ENTITY IN TDD RADIO COMMUNICATIONS

PRIORITY

This nonprovisional application is a U.S. National Stage Filing under 35 U.S.C. § 371 of International Patent Application Serial No. PCT/CN2014/079959, filed Jun. 16, 2014, and entitled "METHOD AND ENTITY IN TDD RADIO COMMUNICATIONS."

TECHNICAL FIELD

The present technology generally relates to radio communications, particularly to a radio network entity for improving filtering performance in a time division duplexing radio communication system and to the method thereof.

BACKGROUND

Cellular technologies specified by the 3rd Generation Partnership Program (3GPP) are the most widely deployed in the world. A new step being studied and developed in 3GPP is an evolution of 3G into an evolved radio access technology referred to as Long-Term Evolution (LTE). In LTE, different modes of communication can be used for radio nodes in a cellular network, such as Frequency Division Duplex (FDD), Time Division Duplex (TDD) and half duplex.

In a TDD radio communication system, the uplink and downlink communications between a radio base station and a user equipment use the same frequency channel (i.e., carrier) but different time slots to separate receiving and transmitting, i.e. receiving and transmitting take place in different, non-overlapping time slots.

Block diagram of parts or whole of a typical radio network entity for TDD communication is shown in FIG. 2. The radio network entity could be a user equipment, or a radio base station in a TDD radio communication system. Besides, the ratio network entity could be a part, internal, or external to (and connected to with a wired connection) a user equipment or a radio base station in a TDD radio communication system. As receiving and transmitting in a TDD radio communication system use the same frequency channel, a shared TDD filter 27 is used for both transmitting and receiving signals.

Actually, filtering requirements for transmitting and receiving signals are different, and the filtering requirement may vary according to different scenarios. In order to meet the different requirements with one shared TDD filter, worse case of out-of-band attenuations need to be considered, which causes that the filter insertion loss is increased, and unnecessary system performance degradation is resulted.

SUMMARY

Therefore, it is an object to solve at least one of the above-mentioned problems.

According to one aspect of the embodiments, there is provided a radio network entity for improving filtering performance in a time division duplexing, TDD, radio communication system, comprising: a first filter, which is configured to perform a first type of filtering for a signal to be transmitted to, or received from a device in the radio communication system through a radio interface, with a common filtering requirement for transmitting and receiving fulfilled, a second filter, which is configured to perform a second type of filtering for the signal to be transmitted to the device, with additional filtering requirement for transmitting besides the common filtering requirement fulfilled; and a third filter, which is configured to perform a third type of filtering for the signal received from the device, with additional filtering requirement for receiving besides the common filtering requirement fulfilled.

According to another aspect of the embodiments, there is provided a method for a radio network entity for improving filtering performance in a time division duplexing, TDD, radio communication system, comprising: performing a second type of filtering for a signal to be transmitted to a device in the radio communication system through a radio interface, with additional filtering requirement for transmitting besides a common filtering requirement for transmitting and receiving fulfilled; and performing a first type of filtering for the signal to be transmitted to, or a signal received from a device in the radio communication system through a radio interface, with the common filtering requirement for transmitting and receiving fulfilled.

The first filter and the second filter constitute a separate transmitting filter, and the first filter and the third filter constitute a separate receiving filter. As a whole, the three filters do not have to be positioned together, and may be dispersed to be more space efficient. The three filters, all together, cost less than just one shared filter in the prior art due to decreased power handling requirement. A separate path exists for a transmitting signal, so that the transmitting filter does not need to sacrifice its insertion loss (IL) to meet blocking requirement of a receiver. Besides, less IL for the transmitting filter will contribute to thermal and power efficiency. A separate path exists for a received signal, so that the receiving filter does not need to sacrifice its IL to meet transmitting spurious emission requirement and less IL resulted for the receiving filter will contribute to an improved noise figure and receiver sensitivity. More flexibility for the third filter implementation could be achieved because the third filter is released from power handling and passive intermodulation requirements. The transmitting filter can get better power handling performance if less attenuation is needed compared with the prior art TDD filter.

BRIEF DESCRIPTION OF THE DRAWINGS

The technology will now be described, by way of example, based on embodiments with reference to the accompanying drawings, wherein.

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning that is consistent with its meaning in the context of this specification and the relevant art and will not be interpreted in an idealized or overly formal sense unless expressly so defined herein.

Embodiments herein will be described below with reference to the drawings.

Hereinafter, the embodiments will be described in the context of TDD radio communication system. However, such a description is only exemplary, rather than restrictive, and the embodiments are also applicable to other types of network which exist for the present or will exist in the future as appropriate.

Figure 1:
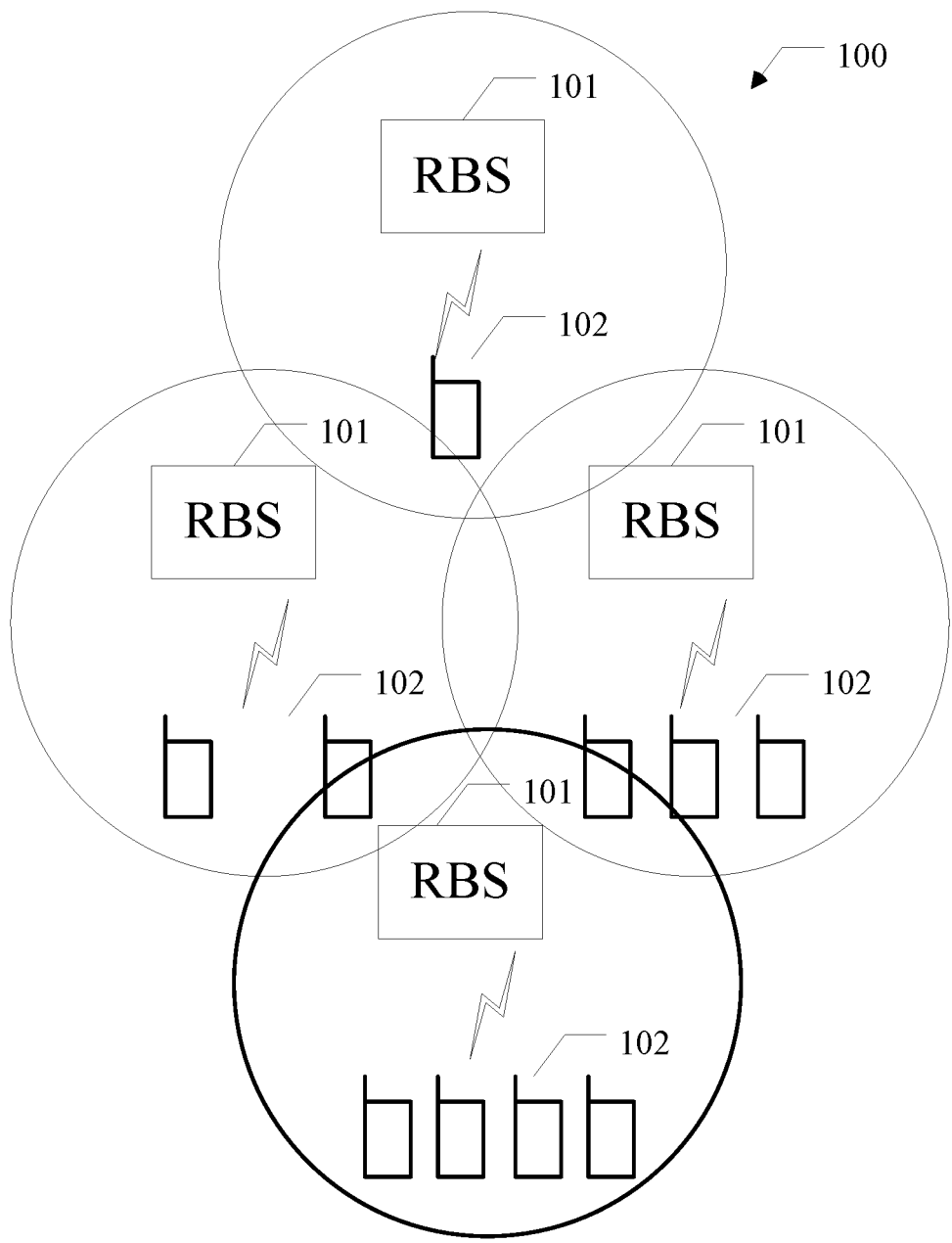
FIG. 1 illustrates a schematic view of the environment in which embodiments are implemented.

FIG. 1 illustrates a schematic view of the environment in which embodiments are implemented.

A TDD radio communication system 100 includes a plurality of radio base stations (RBSs) 101. For example, and for sake of simplicity, four RBSs 101 are shown.

Here, the connections between RBSs 101 may be implemented in a wired or wireless way, or combination thereof.

Further, those skilled in the art will also appreciate that a radio base station 101 is sometimes also referred to in the art as a base station, a macro base station, a femto base stations, a node B, or B-node, an eNode B, etc., besides, also other transceivers or wireless communication stations used to communicate with the user equipment (UE) 102.

In the illustrated environment, for sake of simplicity, each RBS 101 is shown as serving one cell. Each cell is represented by a circle which surrounds the respective RBS 101. It will be appreciated by those skilled in the art, however, that an RBS 101 may serve for communicating across the air interface for more than one cell. For example, two cells may utilize resources situated at the same RBS site.

A UE, such as the UE 102 shown in FIG. 1, communicates with one or more cell(s) or one or more RBS(s) 102 over a radio or an air interface. For simplicity and clarity, there are sets of 1, 2, 3, and 4 UE(s), each in a cell respectively. It will be appreciated that different numbers of UEs may be served by a cell and the numbers of UEs served by different cells need not to be identical. The term "UE" used herein may indicate all forms of devices enabled to communicate via a communication network, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices, etc., which communicate voice and/or data with radio access network.

In a TDD radio communication system, the uplink and downlink communication between an RBS and a UE use the same frequency channel (i.e., carrier) but different time slots to separate receiving and transmitting, i.e. receiving and transmitting take place in different, non-overlapping time slots.

Figure 2:
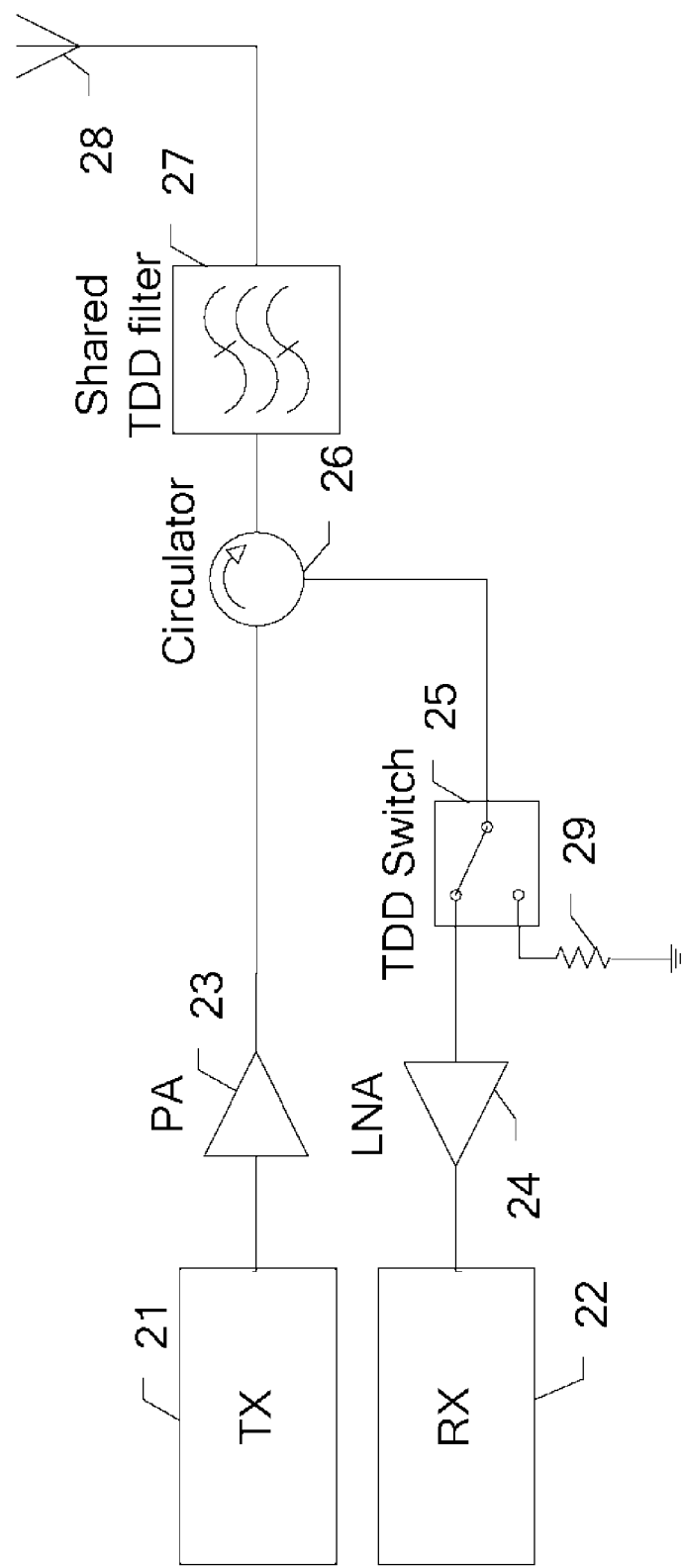
FIG. 2 illustrates a block diagram of a radio network entity for TDD communication in the prior art.

Block diagram of a typical radio network entity for TDD communication in the prior art is shown in FIG. 2. The radio network entity could be a UE 102, or an RBS 101 in a TDD radio communication system 100. Besides, the ratio network entity could be a part, internal, or external to (and connected to with a wired connection) a UE 102 or an RBS 101 in a TDD radio communication system. As receiving and transmitting in a TDD radio communication system use the same frequency channel, a shared TDD filter 27 is configured for both transmitting and receiving signals to or from a device in the TDD radio communication system 100. The radio network entity comprises an antenna 28, also known as an aerial, or a transducer designed to transmit or receive electromagnetic (e.g. radio) waves, transducing from electrical signals to electromagnetic waves, or vice versa. The radio network entity further comprises a circulator 26, which plays a role to separate a transmitting path and a receiving path, a TDD switch 25, which is configured to route transmitting leakage signals to 50 ohm resistor 29 and then to the ground in transmitting slots and connect to a receiver (RX) 22 in receiving slots, a power amplifier (PA) 23, which is configured to perform power amplifying for signals to be transmitted through the antenna 28, a low noise amplifier (LNA) 24, which is configured to perform power amplifying for signals received through the antenna 28, particularly to boost the desired signal power while adding as little noise and distortion as possible, a transmitter (TX) 21, which is configured to configure the signal for proper transmission according to radio communication protocols in the TDD radio communication system 100, and the RX 22 for proper receiving according to radio communication protocols in the TDD radio communication system 100. The part between the antenna 28 and RX 22 is referred to as a receiver front end, and the part between the antenna 28 and the TX 21 is referred to as a transmitter back end in the art.

For transmitting signals, to eliminate out-of-band spurious emission is a mandatory requirement, while for receiving signals, to eliminate out-of-band blocking is a mandatory requirement. For example in one scenario, for transmitting signals, spurious emission elimination at a higher side of the operation band needs to be mainly considered, and attenuation required at a lower side of the operation band is relatively more relaxed. For receiving signals, blocking elimination requires tougher filter attenuation at the lower side of the operation band and attenuation required at the higher side is relatively more relaxed. As is shown in the upper part of FIG. 3, a dot dashed line stands for passband of filtering requirement in frequency domain for transmitting signals, and a dotted line stands for passband of filtering requirement in frequency domain for receiving signals. Embodiments in the disclosure herein will refer this scenario for illustrative purposes rather than limiting.

It is noted that such a scenario is only for illustrative purposes rather than limiting. In other scenarios, for transmitting signals, spurious emission elimination at lower side of operation band needs to be mainly considered, and attenuation required at higher side of operation band is relatively more relaxed, and for receiving signals, blocking elimination requires tougher filter attenuation at the higher side of the operation band and attenuation required at the lower side is relatively more relaxed.

In order to satisfy filtering requirements for both transmitting signals and receiving signals utilizing a common filter, tougher attenuations at both the lower side and the higher side have to be applied to both transmitting signals and receiving signals. It means at the lower side, the tougher attenuation which is not necessary for transmitting signals has to be applied to them, and at the higher side, the tougher attenuation which is not necessary for receiving signals has to be applied to them. As a result, passband of the common filter is formed as shown in lower part of FIG. 3.

Figure 3:
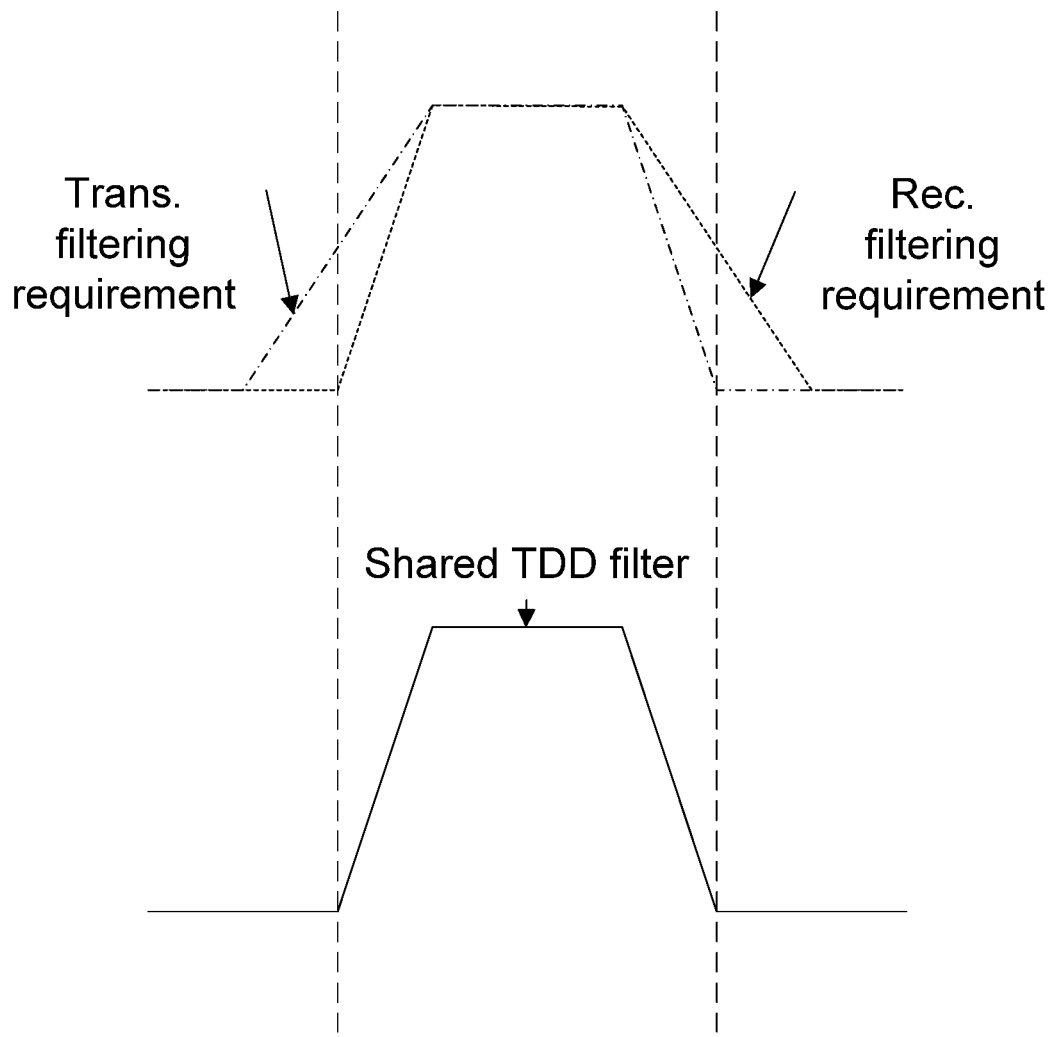
FIG. 3 illustrates attenuation allocations for the radio network entity for TDD communication in the prior art.

Besides, the filtering requirement for receiving signals at the higher side of the operation band as shown in FIG. 3 is designed to meet all possible critical blocking elimination requirements, the blocking may being caused by interferences from other sources due to co-location or co-existence. But for some or even most TDD radio communications, blocking interferences due to co-location or co-existence may not exist, which means the attenuation at higher side of the operation band for filtering requirement for receiving signals shown in FIG. 3 is not always required.

Figure 4:
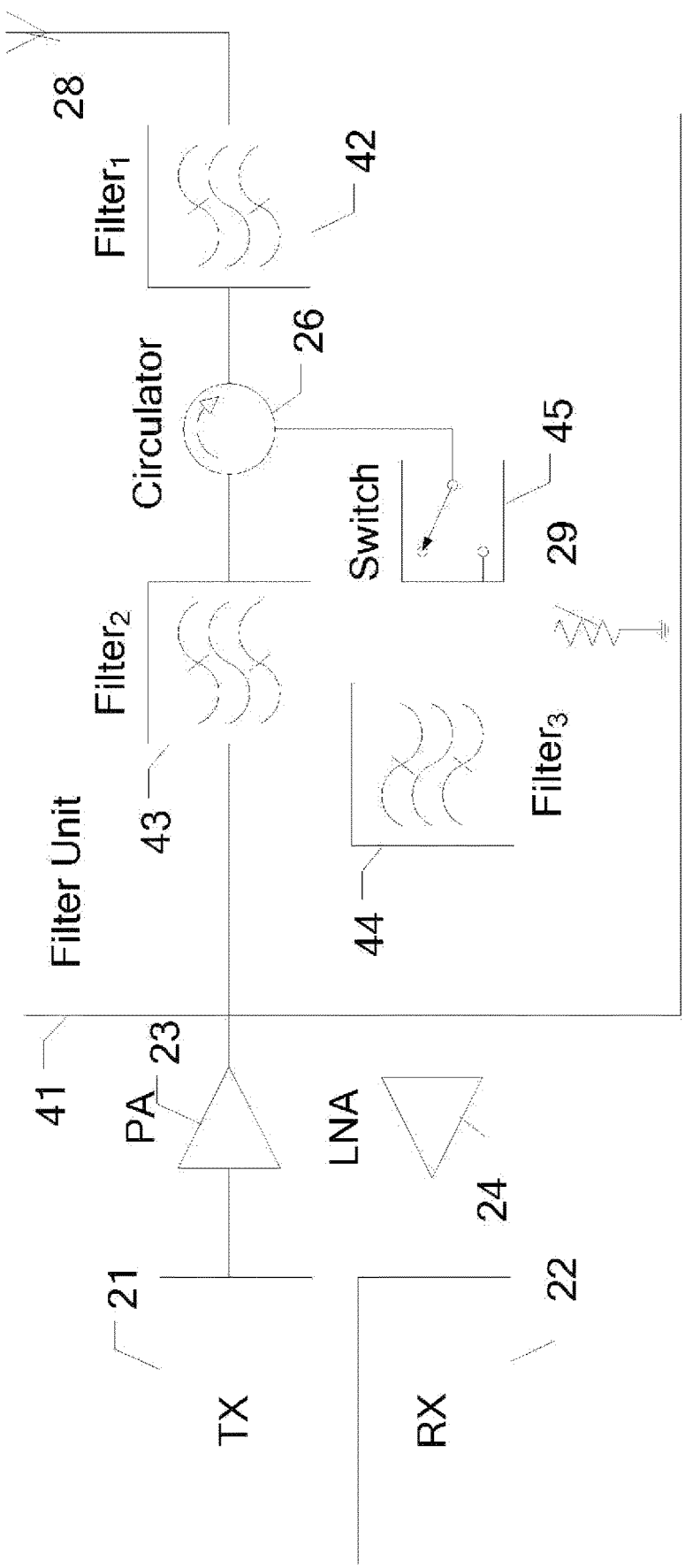
FIG. 4 illustrates a block diagram of a radio network entity for TDD communication in accordance with some embodiments of the present invention.

FIG. 4 illustrates a block diagram of a radio network entity for TDD communication in accordance with some embodiments of the present invention. The radio network entity could be a UE, or an RBS in a TDD radio communication system. Besides, the ratio network entity could be a part, internal, or external to (and connected to with preferably a wired connection) a UE 102 or an RBS 101 in a TDD radio communication system 100. The radio network entity comprises an antenna 28, a circulator 26, a dual path switch 45, a power amplifier (PA) 23, a low noise amplifier (LNA) 24, a transmitter 21, a receiver 22, filter$_1$ 42, filter$_2$ 43, and filter$_3$ 44.

The antenna 28 is a transducer configured to transmit or receive signals in the form of electromagnetic waves, transducing from electrical signals to electromagnetic waves, or vice versa. In most cases, the antenna 28 is shared for both transmitting and receiving according to the reciprocity principle of antenna. However, it does not exclude a scenario that two separate antennas are configured for transmitting and receiving respectively. The circulator 26 is configured to plays a role to separate a transmitting path and a receiving path within the radio network entity, and could be replaced by a switch to fulfill similar functions. The switch 45 is configured to route transmitting leakage signals to the 50 ohm resistor 29 and then to the ground in transmitting slots and connect to the receiver (RX) 22 in receiving slots. The power amplifier (PA) 23 is configured to perform power amplifying for signals to be transmitted through the antenna 28. The low noise amplifier (LNA) 24 is configured to perform power amplifying for signals received through the antenna 28, particularly to boost the desired signal power while adding as little noise and distortion as possible. The transmitter 21 is configured to configure the signal for proper transmission according to radio communication protocols in the TDD radio communication system 100. The receiver 22 is configured for proper receiving according to radio communication protocols in the TDD radio communication system 100. It is noted that the antenna 28, the circulator 26, the dual path switch 45, the PA 23, the LNA 24, the transmitter 21 and the receiver 22 are applicable to conventional rules, and those elements could easily be bought on the market.

The filter$_1$ 42 is configured to perform a first type of filtering for a signal to be transmitted to, or received from a device in the TDD radio communication system 100 through the antenna 28, with a common filtering requirement for transmitting and receiving fulfilled. Filter$_2$ 43 is configured to perform a second type of filtering for signals to be transmitted to the device, with additional filtering requirement for transmitting besides the common filtering requirement fulfilled. Filter$_3$ 44 is configured to perform a third type of filtering for signal received from the device, with additional filtering requirement for receiving besides the common filtering requirement fulfilled. It is noted that the device could be the UE 102 or the RBS 101, and in the hierarchically structured radio communication system shown in FIG. 1, when the radio network entity is, or internally or externally belongs to the UE 102, the device herein is the RBS 101 and when the radio network entity is, or internally or externally belongs to the RBS 101, the device herein is the UE 102.

In transmitting slots, a signal to be transmitted through the antenna 28 to a device in the radio communication system is generated in the TX 21, and it will then go in order through PA 23, the filter$_2$ 43, the circulator 26, the filter$_1$ 42 till the antenna 28 and be transduced into electromagnetic waves in the air. Meanwhile, the switch 45 will route a leakage signal as a part of the signal to be transmitted to the 50 ohm resistor 29 and then to the ground. In receiving slots, a signal is received through the antenna 28 and will go in order through the filter$_1$ 42, the circulator 26, the switch 45, the filter$_3$ 44, the LNA 24 till the RX 22.

In the embodiment shown in FIG. 4, filter$_3$ 44 only carries low power radio frequency signals, so it does not need to fulfill high power handling and passive intermodulation requirements. Thus filter$_3$ 44 has more flexibility on implementation, for example, in one scenario, high Q value is the main concern, thus flexible cavity size can be implemented to ensure the Q value; in another scenario, miniaturization is the main concern, then more types of resonators such as microwave planar circuit resonator, which can be realized on PCB can be used, which will contribute much to miniaturization of filter$_3$ 44 for sure with the penalty on the lower Q value of the resonator; In still another scenario, medium size and medium Q value are required, and the implementation thereof could thus be designed. It is similar for filter$_2$ 43.

It is common in the art that Q value (or, Q factor) refers to a measurement of a resonant system's relative bandwidth. Q value is a dimensionless parameter that describes how under-damped an oscillator or resonator is, or equivalently, characterizes a resonator's bandwidth relative to its center frequency. Generally, High-Q filter would do a better job of filtering out signals that lie nearby on the intended band and have lower insertion loss.

It will be appreciated by those skilled in the art that the switch 45 could be replaced by a proper set of voltage control diode to fulfill similar functions.

It will be appreciated by those skilled in the art that the signal received through the antenna 28 may go in order through the filter₁ 42, circulator 26, the LNA 24, the switch 45, the filter₃ 44 till the RX 22. In that case the LNA 24 is positioned between the circulator 26 and the switch 45 (not shown).

It is advantageous to have the LNA 24 positioned this way, and this embodiment can improve noise figure of receiver front end of the radio network entity. It will be appreciated by those skilled in the art that the LNA 24 could be blocked by strong signals, such as strong interferences from other sources due to co-location or co-existence, therefore, the performance of the LNA 24 in this embodiment depends on out-of-band rejection of filter₁.

Figure 5:
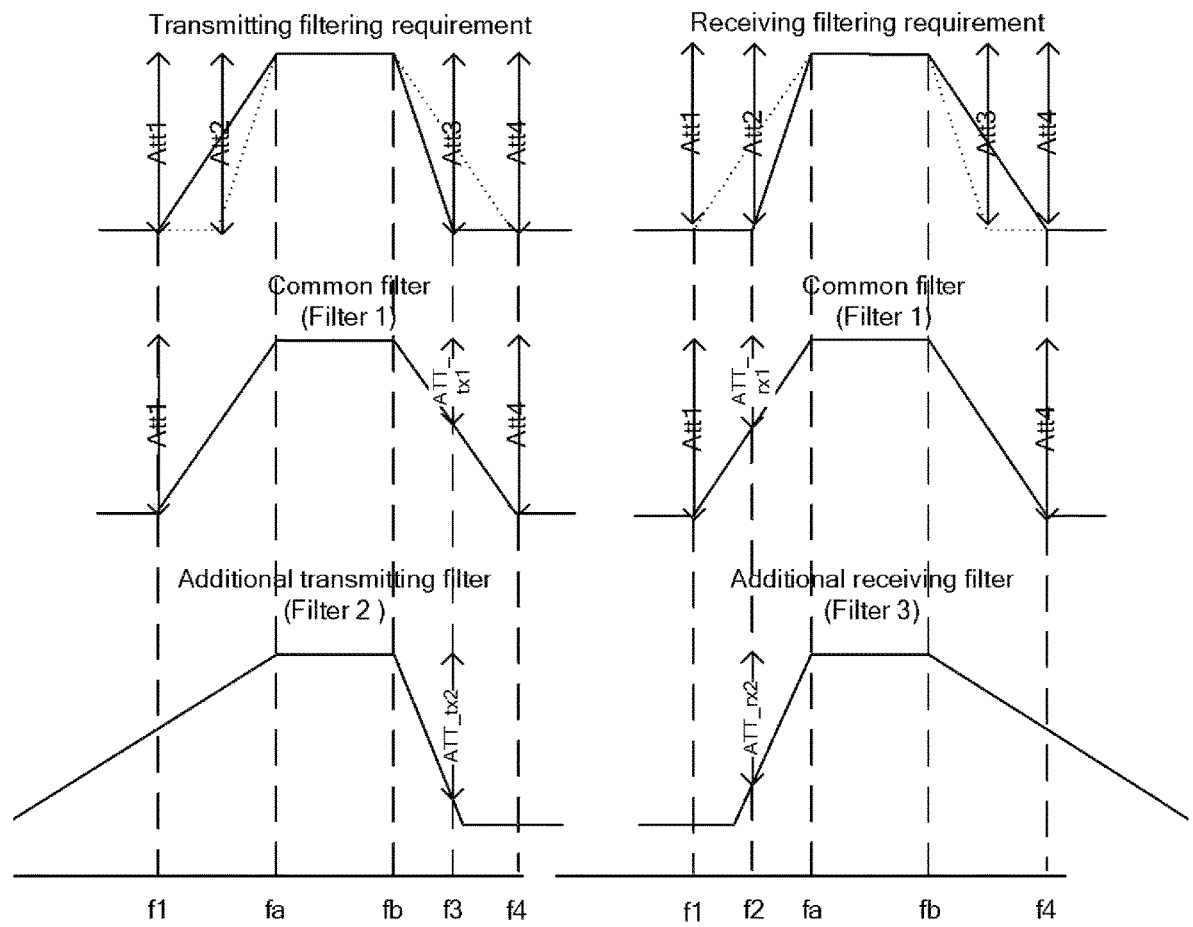
FIG. 5 illustrates attenuation allocations for the radio network entity for TDD communication in accordance with embodiments of the present invention.

FIG. 5 illustrates attenuation allocations for the radio network entity for TDD communication in accordance with embodiments of the present invention. As shown in FIG. 5, a common filter, i.e., filter₁ 42 needs to meet basic attenuations for both the transmitting path and the receiving path, which are attenuation Att1 at frequency f1 and attenuation Att4 at frequency f4. Additional transmitting filter, i.e. filter₂ 43 needs to provide further attenuation needed for transmitting path only, which is attenuation ATT_tx2 at frequency f3. ATT_tx2 is Att3 minus common filter attention ATT_tx1 at frequency f3. Additional receiving filter, i.e. filter₃ 44 needs to provide further attenuation needed for receiving path only, which is attenuation ATT_rx3 at frequency f2. ATT_rx3 is Att2 minus common filter attention ATT_rx1 at frequency f2.

As is known in the art, the attenuation requirement is in positive relation to the needed pole number of the filter. As unnecessary attenuations are avoided, the unnecessary poles are waived, in other words, the needed pole number is reduced, and the insertion loss caused by unnecessary poles is thus avoided.

Figure 6:
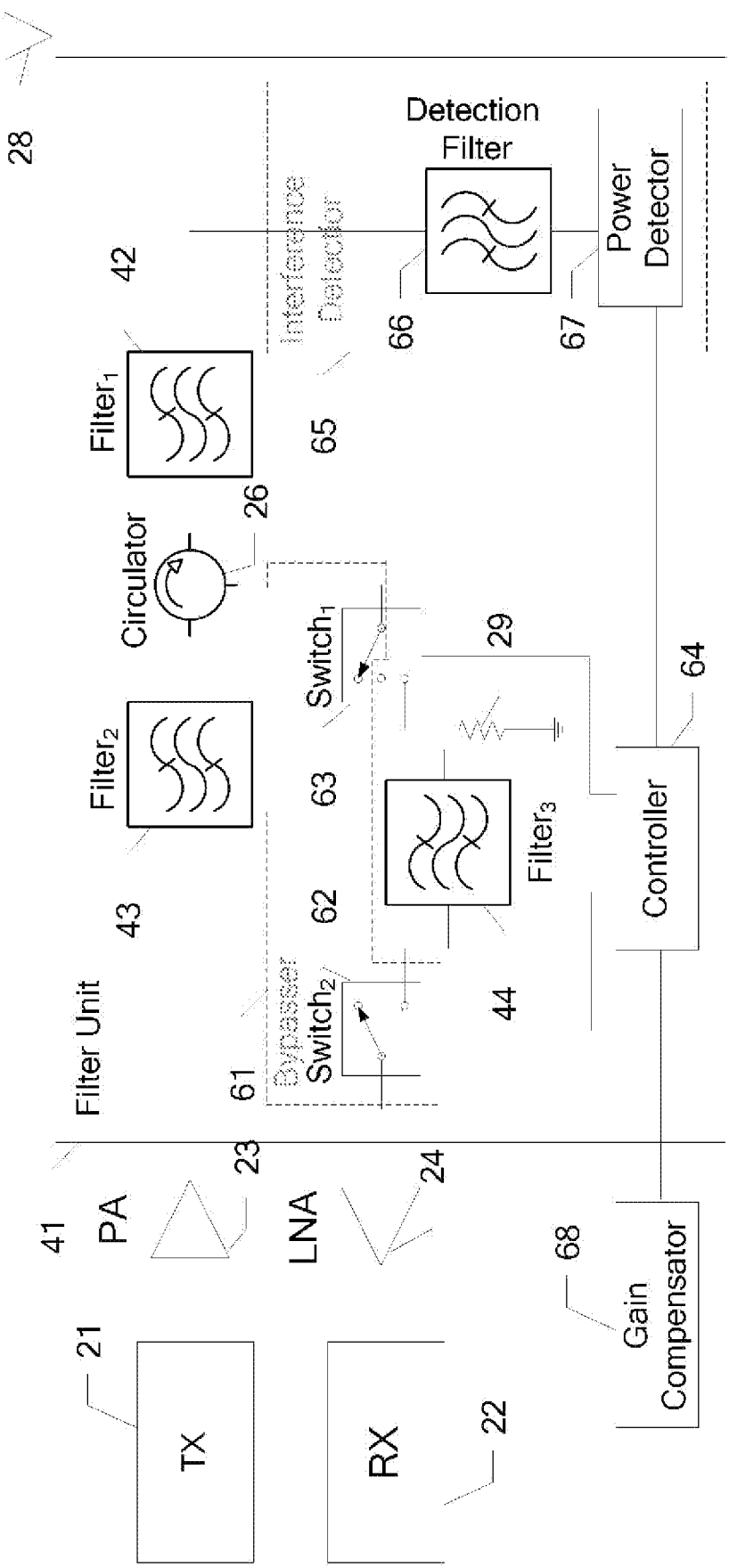
FIG. 6 illustrates a block diagram of a radio network entity for TDD communication in accordance with other embodiments of the present invention.

FIG. 6 illustrates a block diagram of a radio network entity for TDD communication in accordance with other embodiments of the present invention. In one embodiment, besides the elements shown in FIG. 4, there is a bypasser 61 in FIG. 6, the bypasser 61 is configured at least based on a connection between a dual path switch, switch₂ 62 and a triple path switch, switch₁ 63. Therefore there are two routes for the received signals coming out from the circulator 26. One is a filtering route, in which the received signals coming out from the circulator 26 will route in order though switch₁ 63, filter₃ 44, switch₂ 62 to the LNA 24. The other is a bypass route, in which the received signals coming out from the circulator 26 will route in order though switch₁ 63, switch₂ 62 to the LNA 24, bypassing filter₃ 44.

In another embodiment, it can be assumed that strong interferences, such as interferences from nearby RBSs, are almost stable in certain time period. Then, enough non-transmitting periods can be utilized for interference detection to decide switching between the filtering route and the bypass route in the receiving path. The radio network entity further comprises an interference detector 65 coupled to the antenna 28, configured to detect interferences received, and a controller 64 configured to control operation of the bypasser 61, i.e., to control status of switch₁ 63 and switch₂ 62 based on the detected interferences.

In a further embodiment, the interference detector 65 further comprises a detection filter 66 and a power detector 67. The detection filter 66 is configured to couple to the antenna 28 and obtain the interferences when the antenna 28 is not performing transmission, and the power detector 67 is configured to determine power level of the interferences. Besides, the controller 64 is further configured to switch between the bypass route and the filtering route, i.e., to activate the bypass route if the power level of the interferences is lower than a predetermined threshold, and activate the filtering route if the power level of the interferences is not lower than the predetermined threshold, by controlling status of switch₁ 63 and switch₂ 62.

In a further embodiment, the radio network entity further comprises a gain compensator 68, which is configured to perform gain compensation between the bypass route and the filtering route. Besides, the controller 64 is further configured to notify the gain compensator 68 of the activating of the bypass route and the filtering route, i.e., begin and end time information of transmission through the bypass route and that through the filtering route.

Figure 7:
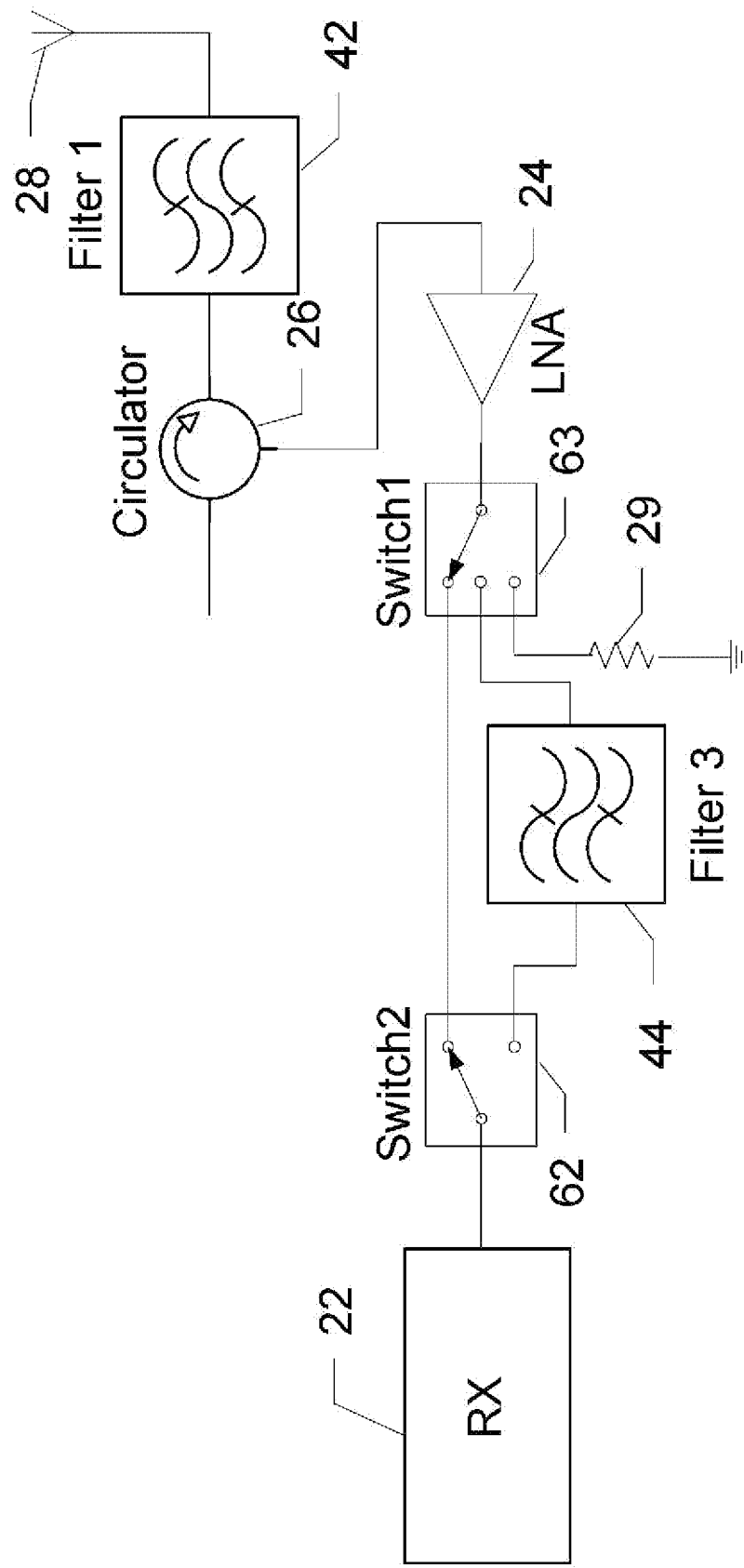
FIG. 7 illustrates part of a block diagram of a radio network entity for TDD communication in accordance with one embodiment of the present invention.

It will be appreciated by those skilled in the art that the signal received through the antenna 28 may go in order through the filter₁ 42, the circulator 26, the LNA 24, the switch₁ 63, then the filter₃ 44, the switch₂ 62 to the RX 22, or that the signal received through the antenna 28 may go in order through the circulator 26, the LNA 24, switch₁ 63, then directly switch₂ 62 bypassing filter₃ 44 to the RX 22. In that case the LNA 24 is positioned between the circulator 26 and switch₁ 63, as is shown in FIG. 7.

It is advantageous to have the LNA 24 positioned this way, and this embodiment can improve noise figure of receiver front end of the radio network entity. It will be appreciated by those skilled in the art that the LNA 24 could be blocked by strong signals, such as strong interferences from other sources due to co-location or co-existence, therefore, the performance of the LNA 24 in this embodiment depends on out-of-band rejection of filter₁.

Figure 8:
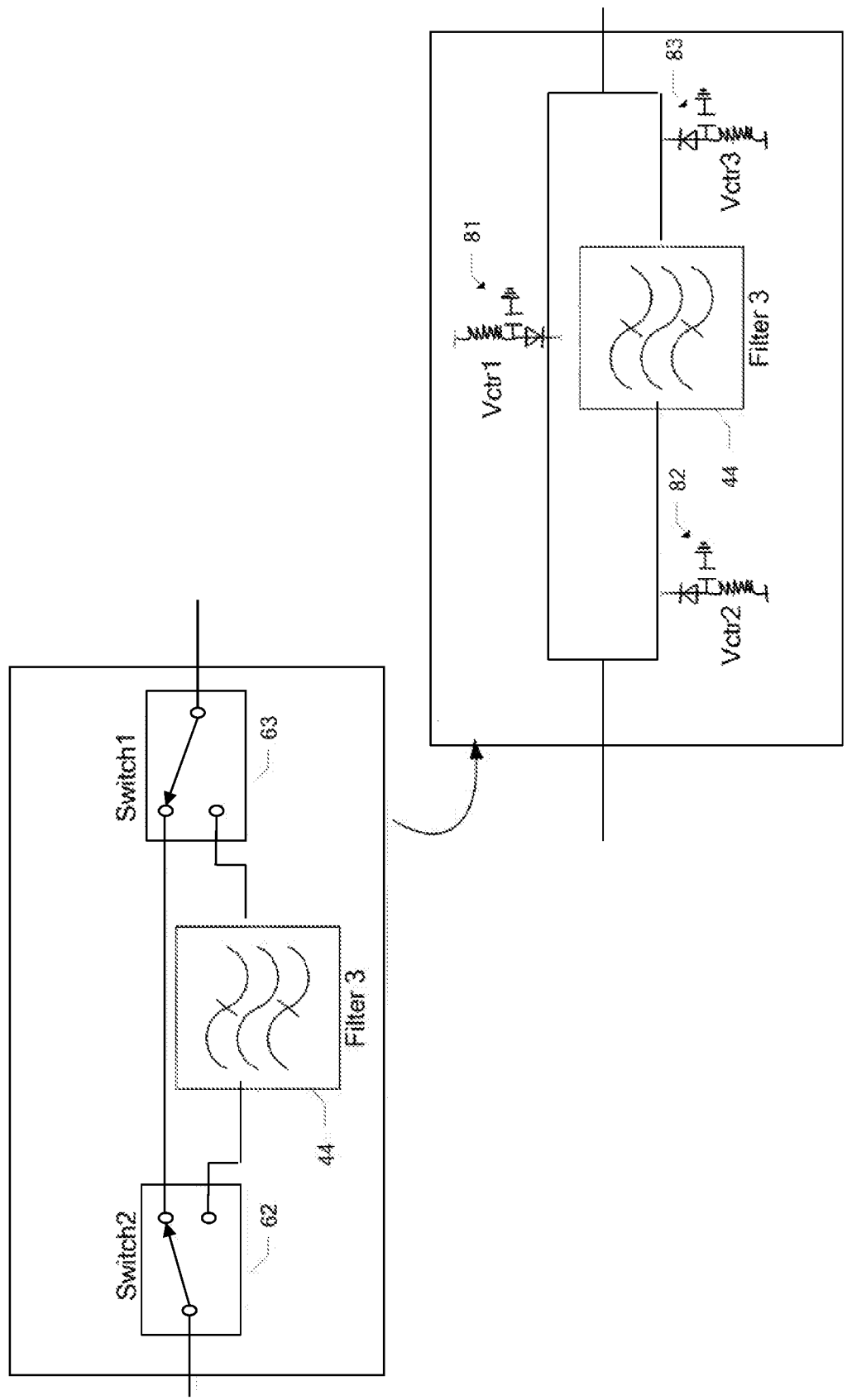
FIG. 8 illustrates part of a block diagram of a radio network entity for TDD communication in accordance with another embodiment of the present invention.

It will be appreciated by those skilled in the art that the switch₁ 63 and switch₂ 62 could be replaced by a proper set of voltage control diode to fulfill similar functions. As is shown in FIG. 8, $V_{ctr1}$ 81 acts as a switch to activate or deactivate the bypass route. $V_{ctr2}$ 82 and $V_{ctr3}$ 83 act as a switch to activate or deactivate the filtering route.

It should be understood that this and other arrangements described herein are set forth only as examples. Other arrangements and elements (e.g., an elliptic low pass filter to give additional attenuation close to the pass band, circulators instead of switches, etc.) can be used in addition to or instead of those shown, and some elements may be omitted altogether.

The first filter filter₁ 42 and the second filter filter₂ 43 constitute a separate transmitting filter, and the first filter filter₁ 42 and the third filter filter₃ 44 constitute a separate receiving filter. As a whole, the three filters filter₁ 42, filter₂ 43 and filter₃ 44 do not have to be positioned together, and may be dispersed to be more space efficient. The three filters, all together, cost fewer than just one shared filter in the prior art due to decreased power handling requirement. A separate path exists for a transmitting signal, so that the transmitting filter does not need to sacrifice its insertion loss (IL) to meet blocking requirement of the receiver 22. Besides, less IL for the transmitting filter will contribute to thermal and power efficiency. A separate path exists for a received signal, so that the receiving filter does not need to sacrifice its IL to meet transmitting spurious emission requirement and less IL resulted for the receiving filter will contribute to an improved noise figure and receiving sensitivity. Variance of the receiving filter could be applied according to an interference signal power level, by activating and bypassing the third filter. More flexibility for the third filter filter₃ 44 implementation could be achieved, because the third filter filter₃ 44 is released from power handling and passive intermodulation requirements. The transmitting filter can get better power handling performance if less attenuation is needed compared with the prior art TDD filter.

Figure 9:
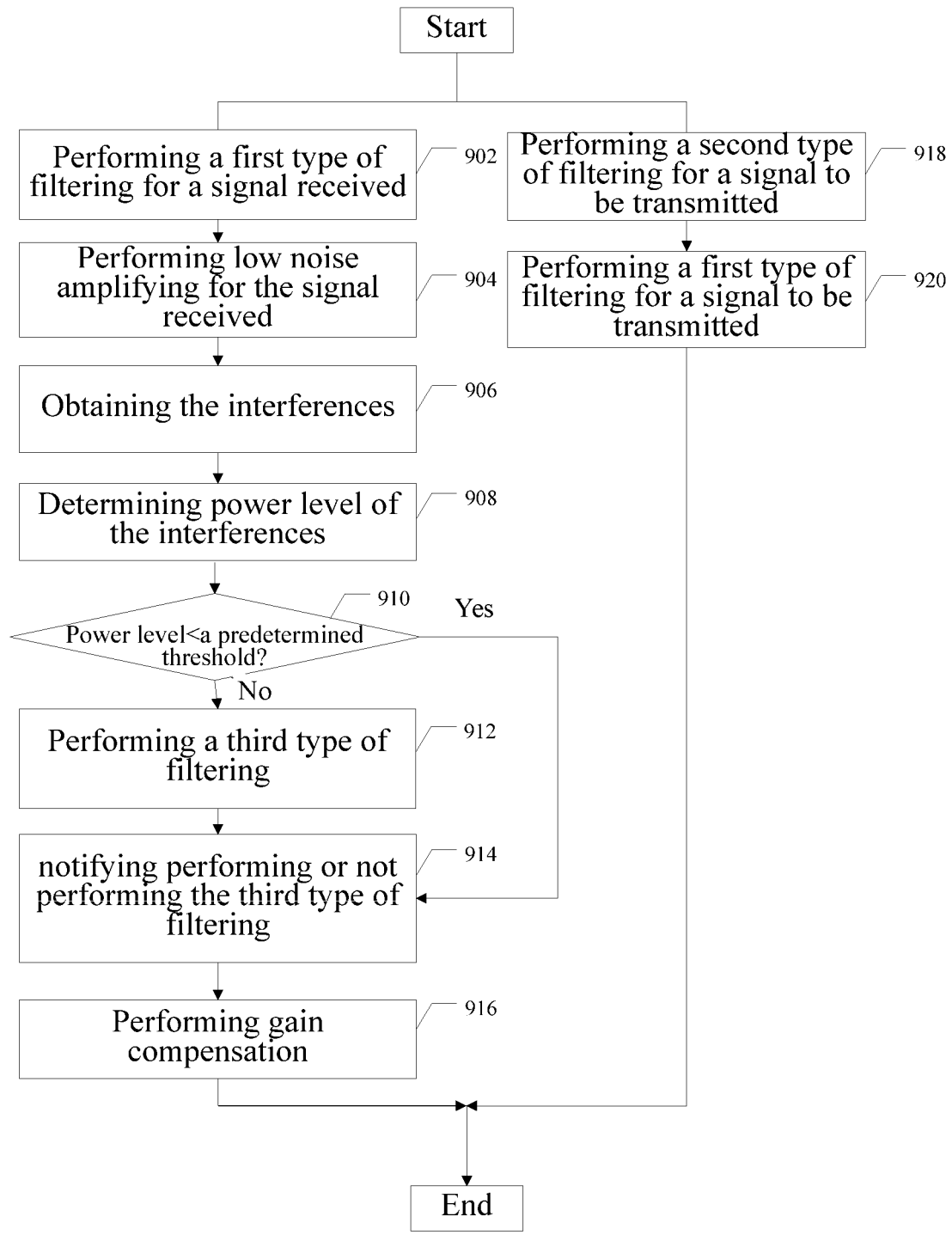
FIG. 9 illustrates a flowchart of a method performed in a radio network entity for TDD communication in accordance with embodiments of the present invention.

FIG. 9 illustrates a flowchart of a method performed in a radio network entity for TDD communication in accordance with embodiments of the present invention.

In one embodiment, after a signal to be transmitted to a device in the TDD radio communication system 100 through the antenna 28 arrives from the TX 21 and goes through the PA 23, a second type of filtering is performed for it, with additional filtering requirement for transmitting besides a common filtering requirement for transmitting and receiving fulfilled at step 918, following the passband of additional transmitting filter in FIG. 5, and then a first type of filtering is performed for it, with the common filtering requirement for transmitting and receiving fulfilled at step 920, following the passband of common filter in FIG. 5.

In another embodiment, after a signal is received from a device in the radio communication system through the antenna 28, a first type of filtering is performed for the signal, with the common filtering requirement for transmitting and receiving fulfilled at step 902, following the passband of common filter in FIG. 5.

In a further embodiment, the interferences from other sources due to co-location or co-existence are obtained at step 906. The interferences could be obtained anytime when the antenna 28 is not performing transmission, including at idle periods and guard periods. Then power level of the interferences is determined. If the power level is determined not lower than a predetermined threshold at step 910, a third type of filtering with additional filtering requirement for receiving besides the common filtering requirement fulfilled is performed for the signal received at step 912, following the passband of additional receiving filter in FIG. 5.

In a further embodiment, time information of performing or not performing the third type of filtering is notified for the purpose of gain compensation at step 914, and then the gain compensation between signals with and without the third type of filtering being performed could be performed at step 916.

In one example, low noise amplifying is performed for the signal received at step 904 following step 902. In another example, low noise amplifying is performed for the signal received right before it being processed by a receiver.

It is advantageous to have low noise amplifying performed for the signal received at step 904 following step 902, as it can improve receiving sensitivity.

It will be appreciated by those skilled in the art that steps 906, 908, 910, 914 and 916 are not necessary.

The first filter filter$_1$ 42 and the second filter filter$_2$ 43 constitute a separate transmitting filter, and the first filter filter$_1$ 42 and the third filter filter$_3$ 44 constitute a separate receiving filter. As a whole, the three filters filter$_1$ 42, filter$_2$ 43 and filter$_3$ 44 do not have to be positioned together, and may be dispersed to be more space efficient. The three filters, all together, cost fewer than just one shared filter in the prior art due to decreased power handling requirement. A separate path exists for a transmitting signal, so that the transmitting filter does not need to sacrifice its insertion loss (IL) to meet blocking requirement of the receiver 22. Besides, less IL for the transmitting filter will contribute to thermal and power efficiency. A separate path exists for a received signal, so that the receiving filter does not need to sacrifice its IL to meet transmitting spurious emission requirement and less IL resulted for the receiving filter will contribute to an improved noise figure and receiving sensitivity. Variance of the receiving filter could be applied according to an interference signal power level, by activating and bypassing the third filter. More flexibility for the third filter filter$_3$ 44 implementation could be achieved, because the third filter filter$_3$ 44 is released from power handling and passive intermodulation requirements. The transmitting filter can get better power handling performance if less attenuation is needed compared with the prior art TDD filter.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A radio network entity for improving filtering performance in a time division duplexing, TDD, radio communication system, comprising:
   a first filter, configured to perform a first type of filtering for a signal to be transmitted to, or received from a device in the radio communication system through a radio interface, with a common filtering requirement for transmitting and receiving fulfilled;
   a second filter, configured to perform a second type of filtering for the signal to be transmitted to the device, with additional filtering requirement for transmitting besides the common filtering requirement fulfilled;
   a third filter, configured to perform a third type of filtering for the signal received from the device, with additional filtering requirement for receiving besides the common filtering requirement fulfilled;
   a bypasser, configured to selectively activate a bypass route to bypass the third filter for the signal received from the device such that the signal received from the device is filtered using the first type of filtering but not the third type of filtering when a condition is not met; and
   a gain compensator, configured to perform gain compensation between the bypass route and a filtering route that includes the signal being filtered by the third filter; and
   a controller configured to control the operation of the bypasser and notify the gain compensator of timing information associated with the activation of the bypass route, and
   wherein the timing information comprises begin and end time information for transmission through the bypass route.

2. The entity of claim 1, wherein the bypasser comprises a first multipath switch and a second multipath switch, wherein the bypass route is activated with a first path of the first multipath switch connected with a first path of the second multipath switch, and the filtering route is activated with a second path of the first multipath switch connected with an input of the third filter, and a second path of the second multipath switch connected with an output of the third filter.

3. The entity of claim 1, wherein the bypasser comprises a first voltage control diode, a second voltage control diode and a third voltage control diode, with the second voltage control diode and the third voltage control diode connected with the input and output of the third filter respectively, and then connected with the first voltage control diode in parallel.

4. The entity of claim 1, further comprising:
an interference detector, configured to detect interferences received; and
the controller, configured to control operation of the bypasser based on the detected interferences.

5. The entity of claim 4,
wherein the interference detector further comprises:
   a detection filter, configured to couple to a radio interface and obtain the interferences when the radio interface is not performing transmission, and
   a power detector, configured to determine power level of the interferences;
and the controller is further configured to:
activate the bypass route if the power level is lower than a predetermined threshold, and
activate the filtering route if the power level is not lower than the predetermined threshold.

6. The entity of claim 1, further comprising:
a low noise amplifier, configured to perform low noise amplifying for the signal received from the device before performing the third type of filtering for it, or before routing it through a bypass route.

7. The entity of claim 1, wherein the radio network entity is a user equipment, UE, or a radio base station, RBS, in the TDD radio communication system, or wherein the radio network entity is internal or external to any of the UE or the RBS.

8. A method for a radio network entity for improving filtering performance in a time division duplexing, TDD, radio communication system, comprising:
   performing a second type of filtering for a signal to be transmitted to a device in the radio communication system through a radio interface, with additional filtering requirement for transmitting besides a common filtering requirement for transmitting and receiving fulfilled;
   performing a first type of filtering for the signal to be transmitted to, or a signal received from the device in the radio communication system through the radio interface, with the common filtering requirement for transmitting and receiving fulfilled;
   performing a third type of filtering for the signal received, with additional filtering requirement for receiving besides the common filtering requirement fulfilled;
   selectively activating, by a bypasser, a bypass route to bypass the third filter for the signal received from the device such that the signal received from the device is e filtered using the first type of filtering but not the third type of filtering when a condition is not met;
   performing, by a gain compensator, gain compensation between the bypass route and a filtering route that includes the signal being filtered by the third filter; and
   controlling, by a controller, the operation of the bypasser and notifying the gain compensator of timing information associated with the activation of the bypass route, and
wherein the timing information comprises begin and end time information for transmission through the bypass route.

9. The method of claim 8, further comprising:
detecting interferences received; and
performing the third type of filtering for the signal received, with additional filtering requirement for receiving besides the common filtering requirement fulfilled, based on the detected interferences.

10. The method of claim 9, wherein the detecting interferences received further comprises:
   obtaining the interferences when a radio interface is not performing transmission, and
   determine power level of the interferences;
and performing the third type of filtering further comprises:
   if the power level is not lower than a predetermined threshold, performing the third type of filtering.

11. The method of claim 9, further comprising:
performing low noise amplifying for the signal received before performing the third type of filtering.

12. The method of claim 8, wherein the radio network entity is a user equipment, UE, or a radio base station, RBS, in the TDD radio communication system, or wherein the radio network entity is internal or external to any of the UE or the RBS.

* * * * *